US012801355B2

(12) United States Patent
Birru et al.

(10) Patent No.: US 12,801,355 B2
(45) Date of Patent: Nov. 17, 2026

(54) METHOD AND SYSTEM FOR AUTOMATED CODE RETRIEVAL AND CODE GENERATION

(71) Applicant: Quantiphi, Inc, Marlborough, MA (US)

(72) Inventors: Dagnachew Birru, Marlborough, MA (US); Mihir Athale, Marlborough, MA (US); Vishal Vaddina, Toronto (CA)

(73) Assignee: Quantiphi Inc, Marlborough, MA (US)

( * ) Notice: Subject to any disclaimer, the term of this patent is extended or adjusted under 35 U.S.C. 154(b) by 210 days.

(21) Appl. No.: 18/965,486

(22) Filed: Dec. 2, 2024

(65) Prior Publication Data

US 2026/0154048 A1 Jun. 4, 2026

(51) Int. Cl.

*G06F 9/44* (2018.01)
*G06F 8/35* (2018.01)
*G06F 8/41* (2018.01)
*G06N 5/022* (2023.01)

(52) U.S. Cl.

CPC ................ *G06F 8/35* (2013.01); *G06F 8/427* (2013.01); *G06N 5/022* (2013.01)

(58) Field of Classification Search

CPC ........................................................ G06F 8/35
USPC ........................................................ 717/106
See application file for complete search history.

(56) References Cited

U.S. PATENT DOCUMENTS 10,192,000 B2 * 1/2019 Martha ............... G06F 16/2471
2022/0342932 A1 * 10/2022 Monk ................ G06F 16/9024

* cited by examiner

*Primary Examiner* — Evral E Bodden
(74) *Attorney, Agent, or Firm* — Sanders IP Law

(57) ABSTRACT

Disclosed is method for automated code retrieval and code generation, comprising: receiving code repository (302); extracting coding components (CC); generating knowledge graph (KG) comprising nodes representing extracted CC, and edges representing relationships between the extracted CC; identifying node(s) in generated KG for indexing; creating first index (FI) (406, 512) and second index (SI) (408, 514) of generated KG; receiving user request (502) for generating code; searching FI and SI based on entity(s) (510) extracted from user query (UQ) and embeddings (506) of UQ, respectively, for identifying predefined number of nodes (PNN) (516, 520A) in KG; retrieving identified PNN from KG; retrieving neighbouring nodes (NN) (520B-C); generating subgraph of retrieved NN and relationships between retrieved NN; filtering generated subgraph (GS); retrieving code snippets (404C) of retrieved NN; generating contextualized subgraph; and prompting Large Language Model (608) with generated contextualized subgraph, pre-defined KG ontology and area of interest(s), for generating code (610).

18 Claims, 8 Drawing Sheets

METHOD AND SYSTEM FOR AUTOMATED CODE RETRIEVAL AND CODE GENERATION

FIELD OF TECHNOLOGY

The present disclosure relates to a general field of software development. Specifically, the present disclosure relates to a method and a system for code retrieval and code generation.

BACKGROUND

Generally, efficient and accurate software development is a cornerstone of modern technology, as software powers countless applications across industries. Developers rely heavily on reusable code, libraries, and frameworks to speed up development and ensure reliability. However, the vast and growing volume of code repositories creates significant challenges in discovering relevant code snippets or components that align with specific requirements. Furthermore, understanding how the components interact within larger systems is a time-consuming and error-prone process, often leading to delays, inefficiencies, and inconsistencies in the software development lifecycle.

Existing solutions and tools attempt to address the problem of discovering relevant code snippets or components that align with specific requirements by providing search capabilities within the code repositories. The existing tools like basic text-based search engines and code analysers allow the developers to locate code snippets by keyword matching or file name identification. Moreover, other approaches include version control platforms, which facilitate collaborative development by tracking changes and dependencies between files. Additionally, large language models and generative AI systems have started assisting developers by suggesting code snippets or even generating simple functions. However, the existing solutions are often fails to account for the deeper relationships or contextual understanding required to fully harness the interconnected nature of modern codebases.

Despite advancements, the existing solutions still exhibit significant limitations. The text-based search engines lack the ability to comprehend the meaning of code, leading to irrelevant or incomplete results in downstream tasks. The Generative AI systems, while promising, often produce incorrect or inconsistent suggestions due to their inability to accurately interpret the relationships between different code components. These shortcomings in the existing solutions result in inefficiencies, errors, and increased time spent on manual code exploration and debugging, and underscoring.

Therefore, in the light of the foregoing discussion, there exists a need to overcome the aforementioned drawbacks.

BRIEF SUMMARY OF THE DISCLOSURE

The present disclosure provides a method and a system for repository-level code retrieval and generation using a knowledge graph-based framework to enhance the quality, relevance, and accuracy of code generation. The present disclosure seeks to provide a solution to the existing problem of how to simplify and automate a process of the efficient code retrieval and error-free code generation. The aim of the present disclosure is to provide a solution that overcomes at least partially the problems encountered in the prior art and provide an improved method and system for automated code retrieval and code generation. The aim of the present disclosure is achieved by a method and a system for automated code retrieval and code generation using a code repository in form of a contextualized knowledge graph and uses a hybrid retrieval system (semantic, text-based and graph based) to retrieve contextualized code subgraph which in-turn helps an LLM to generate more accurate, less error prone and relevant code.

In one aspect, the present disclosure provides a method for automated code retrieval and code generation. The method comprises receiving a code repository comprising a plurality of codes stored in a plurality of files. Moreover, the method comprises extracting a plurality of coding components from the plurality of codes. Furthermore, the method comprises generating a knowledge graph comprising a plurality of nodes representing the extracted plurality of coding components, and a plurality of edges representing relationships between the extracted plurality of coding components, wherein the knowledge graph is generated based on a predefined knowledge graph ontology. Furthermore, the method comprises identifying at least one node in the generated knowledge graph, for indexing the generated knowledge graph. Furthermore, the method comprises creating a first index and a second index of the generated knowledge graph, based on a complete information and embeddings of the identified at least one node, respectively. Furthermore, the method comprises receiving a user request for generating a code, from a user device. Furthermore, the method comprises searching the first index and the second index of the generated knowledge graph, based on at least one entity extracted from the user query and embeddings of the user query, respectively, for identifying a predefined number of nodes in the knowledge graph having a highest similarity score. Furthermore, the method comprises retrieving the identified predefined number of nodes from the knowledge graph. Furthermore, the method comprises retrieving neighbouring nodes of the retrieved predefined number of nodes, from the knowledge graph, for a predefined number of iterations. Furthermore, the method comprises generating a subgraph of the retrieved neighbouring nodes and relationships between the retrieved neighbouring nodes. Furthermore, the method comprises filtering the generated subgraph, based on rankings of similarity of the retrieved neighbouring nodes with the user query, using a cross-encoder re-ranker, wherein a given retrieved neighbouring node from amongst the retrieved neighbouring nodes having a rank greater than a threshold value is discarded from the generated subgraph. Furthermore, the method comprises retrieving code snippets of the retrieved neighbouring nodes in the filtered subgraph, from the generated knowledge graph. Furthermore, the method comprises generating a contextualized subgraph, based on the retrieved code snippets of the retrieved neighbouring nodes, relationships between the retrieved code snippets of the retrieved neighbouring nodes, and a context of the code to be generated. Furthermore, the method comprises prompting a Large Language Model (LLM) with the generated contextualized subgraph, the predefined knowledge graph ontology and at least one area of interest, for generating the code. Herein, the term "area of interest" refers to a functional area such as data processing, web development or machine learning. It will be appreciated that the at least one area of interest helps the LLM to focus on generating the code that aligns not only with the structure of the contextualized subgraph but also with the specific application or domain requirements defined by the user or the method.

Beneficially, the embodiments of the present disclosure provide a simplified, effective and automated method that ensures accurate, efficient and context-aware retrieval and generation of code. Moreover, the method effectively uses a knowledge graph to represent code components and relationships thereof for contextually accurate retrieval. The dual-indexing leverages both detailed and abstracted representations to enable robust retrieval across varied user queries and ensures that both explicit and implicit relationships within the knowledge graph are utilized. The dual-indexing mechanism improves the precision of the query matching and reduces the likelihood of irrelevant results. Moreover, the integration of subgraph retrieval process ensures that the retrieved code snippets are enriched with contextual information and filtering the subgraph further ensures that only the most relevant components are retained that enhances the quality of generated code. Furthermore, use of the predefined knowledge graph ontology ensures that the method is adaptable to various programming domains and can handle large and diverse code repositories. By providing the LLM with a refined contextualized subgraph, predefined knowledge graph ontology, and user-specified area of interest, the method ensures that the generated code aligns closely with the user's requirements. The contextualized input helps the LLM produce more precise and functionally coherent code suggestions.

In another aspect, the present disclosure provides a system for automated code retrieval and code generation. The system comprises a processing unit. The processing unit is configured to receive a code repository comprising a plurality of codes stored in a plurality of files. Moreover, the processing unit is configured to extract a plurality of coding components from the plurality of codes. Furthermore, the processing unit is configured to generate a knowledge graph comprising a plurality of nodes representing the extracted plurality of coding components, and a plurality of edges representing relationships between the extracted plurality of coding components, wherein the knowledge graph is generated based on a predefined knowledge graph ontology. Furthermore, the processing unit is configured to identify at least one node in the generated knowledge graph, to index the generated knowledge graph. Furthermore, the processing unit is configured to create a first index and a second index of the generated knowledge graph, based on a complete information and embeddings of the identified at least one node, respectively. Furthermore, the processing unit is configured to receive a user request to generate a code, from a user device. Furthermore, the processing unit is configured to search the first index and the second index of the generated knowledge graph, based on at least one entity extracted from the user query and embeddings of the user query, respectively, to identify a predefined number of nodes in the knowledge graph having a highest similarity score. Furthermore, the processing unit is configured to retrieve the identified predefined number of nodes from the knowledge graph. Furthermore, the processing unit is configured to retrieve neighbouring nodes of the retrieved predefined number of nodes, from the knowledge graph, for a predefined number of iterations. Furthermore, the processing unit is configured to generate a subgraph of the retrieved neighbouring nodes and relationships between the retrieved neighbouring nodes. Furthermore, the processing unit is configured to filter the generated subgraph, based on rankings of similarity of the retrieved neighbouring nodes with the user query, using a cross-encoder re-ranker, wherein a given retrieved neighbouring node from amongst the retrieved neighbouring nodes having a rank greater than a threshold value is discarded from the generated subgraph. Furthermore, the processing unit is configured to retrieve code snippets of the retrieved neighbouring nodes in the filtered subgraph, from the generated knowledge graph. Furthermore, the processing unit is configured to generate a contextualized subgraph, based on the retrieved code snippets of the retrieved neighbouring nodes, relationships between the retrieved code snippets of the retrieved neighbouring nodes, and a context of the code to be generated. Furthermore, the processing unit is configured to prompt a Large Language Model (LLM) with the generated contextualized subgraph, the predefined knowledge graph ontology, and at least one area of interest, to generate the code.

The system achieves all the advantages and technical effects of the method of the present disclosure. Herein, the system enables the processing unit to enable accurate, efficient, and context-aware retrieval and generation of code by utilizing a knowledge graph, a refined contextualized subgraph, predefined ontology, and user-specified area of interest.

It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features, and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not too scaled. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF THE DISCLOSURE

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
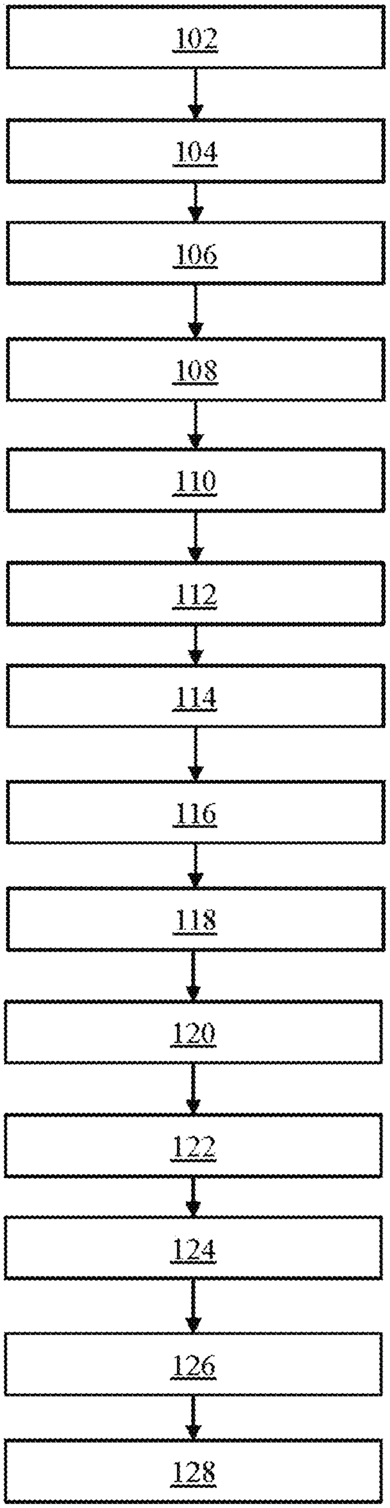
FIG. 1 is a flow chart of a method for automated code retrieval and code generation, in accordance with an embodiment of the present disclosure.

FIG. 1 is a flow chart 100 of a method for automated code retrieval and code generation, in accordance with an embodiment of the present disclosure. The method comprises steps from 102 to 128.

Throughout the present disclosure, the term "code retrieval" refers to a process of identifying, extracting and retrieving relevant code snippets or coding components from a repository of codes. Throughout, the present disclosure, the term "code generation" refers to a process of creating codes based on the retrieved coding components and tailored to a user's query. Notably, the automated code generation is syntactically correct as well as functionally and contextually aligned with the intended purpose of the user. It will be appreciated that the automated code retrieval and code generation automates and streamlines the code generation process by reducing the time needed for manual coding and the effort involved in the retrieval and generation process and improves the code quality by ensuring more relevant and context-aware code generation.

At step 102, a code repository is received comprising a plurality of codes stored in a plurality of files. Throughout the present disclosure, the term "code repository" refers to a repository or storage location where a collection of source code is stored, organized and managed. Typically, the code repository is managed by using version control systems (VCS) like Git, SVN, mercurial and the like, that allows multiple developers to collaborate on the codebase efficiently, track changes and manage updates. Notably, the code repository may include a remote server, cloud-based repository, local file system in device memory of the user device, SSD, hard drive and the like. Throughout the present disclosure, the term "codes" refers to a large number of sequence of instructions, written in a programming language, that is designed to be executed by a user device to perform specific tasks or achieve desired functionality. Notably, the plurality of codes can be written in various programming languages and serve different functional purposes within the application. Moreover, the plurality of codes are components that collectively represent the logic, operations and structure of the software application. Throughout the present disclosure, the term "file" refers to a storage unit within the code repository that encapsulates the plurality of codes. Notably, the plurality of files indicates that the code repository is not limited to a single file, but instead contains multiple files, each of which might store different code components and organize the different code components within the code repository. Furthermore, the plurality of files is the primary unit of storage and organization of the plurality of codes within the code repository, facilitating modularity and maintainability in software development. Furthermore, the code repository serves as the central storage for the plurality of codes stored and the plurality of files associated with a software project. By accessing the code repository, the method can analyse the contents, extract relationships of the codes to perform subsequent tasks like the code retrieval and the code generation. Furthermore, the receiving of the code repository can be achieved through a user upload, a direct integration with the VCS or access to a local or the cloud-based storage location. The code repository is composed of the plurality of files, each containing the plurality of codes and associated data such as documentation, configuration and the like.

At step 104, a plurality of coding components is extracted from the plurality of codes. Throughout the present disclosure, the term "components" refers to individual, identifiable elements within the plurality of codes that carry specific functionality. Throughout the present disclosure, the term "extracting" refers to a process of identifying, isolating and structuring the plurality of components from the plurality of codes. Notably, the extracting is achieved through the use of parsing and analysis techniques such as syntax parsing, semantic analysis, metadata extraction and the like. Moreover, the purpose of extracting the plurality of components from the plurality of codes is to ensure that the relevant elements of the plurality of codes are isolated and represented in a way that the method can process, understand and utilize.

In an implementation, the step of extracting a plurality of coding components from the plurality of codes further comprises identifying one or more parsable files from amongst the plurality of files, based on a coding language of the plurality of codes; parsing the identified one or more parsable files for extracting the plurality of coding components. Herein, the term "parsable files" refers to a subset of files within the plurality of files in the code repository that can be analysed and interpreted programmatically by a parser based on the coding language of the code they contain. Notably, the parsable files are structured in a way that allows syntax and semantics thereof to be programmatically processed by language-specific parsing tools. Herein, the term "coding language" refers to a structured system of syntax, semantics, and rules that is used to write software programs. Typically, the coding language may include Python, Java, C++, JavaScript and the like. Each coding language has its own set of constructs (for example, loops, functions and classes) and grammar, which the parsing tools use to interpret and process the plurality of codes. Herein, the term "parsing" refers to a process of programmatically analysing the content of identified one or more parsable files of the plurality of files to interpret and extract syntactic and semantic structures based on the rules of the specified coding language. It will be appreciated that the identified one or more parsable files is parsed to extract the plurality of coding components form the plurality of codes. Moreover, the one or more parsable files must use the coding language for which the parser exists, for example, include .py for Python, .java for Java, or .cpp for C++. Furthermore, the one or more parsable files is identified from the plurality of files that match the predefined set of coding languages supported by parsing tools thereof. Non-code files (for example, plain text, documentation files) are excluded for further processing. Only the identified parsable files are parsed to extract the plurality of coding components to ensure that the computational resources are focused on relevant and actionable data. A technical effect of identifying the one or more parsable files for extracting the plurality of coding components is that it optimizes the processing workflow by eliminating irrelevant files and directly targeting the one or more parsable files that contribute meaningful coding components to the knowledge graph.

In an implementation, the extracted plurality of coding components comprises at least one of: modules, classes, methods, code snippets. Herein, the term "modules" refers to self-contained units of the plurality of codes that encapsulate related functionalities, typically organized in a single file or a set of files. Notably, the modules serve as logical groupings of code functionality. Typically, the modules are designed to be reusable and may contain variables, functions, classes, and other executable code. For example, a Python file (.py) can serve as the module that can be imported into other scripts. Herein, the term "classes" refers to object-oriented constructs that is used to capture data and behaviour of the objects. Notably, the classes contain attributes (variables) that defines its properties and actions. For example, in Java, a class may define a car with attributes like color. Herein, the term "methods" refers to specific actions or computations that is defined within the scope of the class. Notably, the methods are used to perform specific operations on objects created from the classes. Herein, the term "code snippets" refers to a smaller, reusable fragment or block of the plurality of codes extracted from a larger program. Typically, the code snippets serve a specific purpose such as demonstrating a functionality, implementing an algorithm or serving as examples. Moreover, the code snippets may be simple as a loop or a function or as complex as a short implementation of an API call. It will be appreciated that by focusing on the plurality of coding components, the method ensures that the extracted plurality of coding components is relevant and meaningful for tasks such as the code retrieval and code generation. Furthermore, during the extraction phase, the method scans parsable files in the code repository to identify distinct modules, classes, methods, and code snippets. Using the language-specific parsers, the identified plurality of coding components are isolated and tagged based on their type. Subsequently, the extracted plurality of coding components are categorized into the modules, classes, methods and code snippets for structured representation.

At step 106, a knowledge graph comprising a plurality of nodes representing the extracted plurality of coding components, and a plurality of edges representing relationships between the extracted plurality of coding components is generated, wherein the knowledge graph is generated based on a predefined knowledge graph ontology. Throughout the present disclosure, the term "knowledge graph" refers to a structured, interconnected model used to represent the plurality of codes in the form of nodes and edges. Throughout the present disclosure, the term "nodes" refers to discrete points or entities in the knowledge graph. Notably, the plurality of nodes in the knowledge graph represents the extracted plurality of coding components such as modules, classes, methods and code snippets, which are key building blocks of software. Throughout the present disclosure, the term "edges" refers to links between the plurality of nodes of the knowledge graph that represents relationships between the extracted plurality of coding components. Notably, the edges of the knowledge graph enable communication and interaction between the plurality of nodes. It will be appreciated that by encoding the extracted plurality of coding components and their relationship, the knowledge graph provides a rich contextual model of the plurality of codes and enables enhanced contextual searches and context-rich code retrieval.

In an implementation, the relationships between the extracted plurality of coding components comprises at least one of: imports, usage. Herein, the term "imports" refers to a relationship that indicates the inclusion or reference of one coding component by another coding component amongst the plurality of coding components within the plurality of codes. Typically, the imports are established through import statements in the coding language to make external or internal components available for the code generation. For example, in Python language, the statement "import math" establishes a relationship where the current file is dependent on the "math" module. The imports facilitate to identify modularity and code reuse. Herein, the term "usage" refers to a relationship that captures how a coding component interacts with or makes use of another component within the plurality of codes. For an example, if "class A" calls "method B" from "class C", that represents the usage relationship where "class A" utilizes functionality provided by the "class C". The usage highlights the interaction and functional dependencies between the extracted plurality of coding components Moreover, the relationships between the extracted plurality of coding components comprises at least one of: imports, usage represent interactions between coding components within the knowledge graph. The aforementioned at least one relationship provide context for understanding how the extracted plurality of coding components in the plurality of codes are interconnected. A technical effect of including at least one of: import and usage relationships is to achieve a more comprehensive understanding of the plurality of codes' structure and interactions therebetween, ensuring relevance and accuracy in contextual searches for the code retrieval.

Throughout the present disclosure, the term "predefined knowledge graph ontology" refers to a predefined formal schema or a framework that defined the types of entities, relationships and rules for structuring the plurality of codes in the knowledge graph. It will be appreciated that the predefined knowledge graph ontology ensures consistency in the representation of the extracted plurality of coding components and the relationships between the extracted plurality of coding components across diverse coding languages and code repositories. It will be appreciated that the predefined knowledge graph ontology ensures that the knowledge graph remains interpretable and extensible, facilitating tasks like automated reasoning and efficient query processing. It will also be appreciated that the knowledge graph enables a structured and visualizable representation of the plurality of codes and the relationships between the plurality of extracted coding components are explicitly defined, making dependencies and usage patterns transparent.

At step 108, at least one node in the generated knowledge graph is identified, for indexing the generated knowledge graph. Throughout the present disclosure, the term "indexing" refers to a process of creating an arrangement that facilitates fast and accurate retrieval of the at least one node and the associated data from the generated knowledge graph. Moreover, the at least one node in the generated knowledge graph is identified based on criteria such as relevance, frequency, importance and the like. As the date of filling, the process of indexing is performed by leveraging the indexing capabilities of Neo4j® for indexing the generated knowledge graph for storing the metadata, attributes of the at least one node. However, a person skilled in the art knows that different database management systems (DBMS) such as ArangoDB™ and so forth can be used for the indexing process. It will be appreciated that the indexing of the generated knowledge graph by leveraging the capabilities of Neo4j® and similar DBMS reduces the time required to search for the at least one node or relationship within a large knowledge graph. It will also be appreciated that the indexing supports efficient operations on the knowledge graphs of varying sizes by organizing key information for quick access.

In an implementation, the method further comprises generating a description of each code snippet represented in the generated knowledge graph, using a Small Language Model (SLM). Herein, the term "description" refers to a concise textual summary or explanation of the functionality, purpose, or behaviour of each code snippet represented in the generated knowledge graph. Notably, the description is designed to be human-readable and informative, providing clarity about what the code does, its inputs and outputs, and the like. Moreover, the description of each code snippet represented in the generated knowledge graph may include functional overview, dependencies, inputs/outputs, examples and the like of each code snippet. Herein, the term "small language model (SLM)" refers to a computational language model that is designed to process and generate natural language. Notably, the small language model (SLM) has a smaller architecture and fewer computational resources than large language model (LLM). The SLM is optimized for lightweight operations, making the SLM suitable for scenarios where the computational resources are limited. Additionally, the SLM is fine-tuned for a particular task or domain, such as code snippet documentation or explanation. It will be appreciated that the generated description of each code snippet in the generated knowledge graph enables the user to quickly understand and use the extracted plurality of code components. Furthermore, the SLM processes each code snippet and generates a description based on each code snippet's structure, content, and context within the generated knowledge graph. The descriptions of each code snippets are stored in association corresponding nodes in the knowledge graph for future use. A technical effect of generating the description of each code snippet enables to understand the code snippets without needing to analyse the whole code in detail. Additionally, use of the SLM ensures lightweight and quick generation of descriptions of each code snippet, minimizing resource use while maintaining quality.

In an implementation, the at least one node identified in the generated knowledge graph comprises at least one of: a function name, a class name, a module name, a file documentation, the code snippets, the generated description of corresponding code snippets. Herein, the term "function name" refers to a unique identifier assigned to a specific function in the code, representing a distinct, callable block of code designed to perform a specific task. Notably, the function name serves as the at least one node in the generated knowledge graph. Herein, the term "class name" refers to an identifier given to the class. Notably, the at least one node identified within the generated database comprises the class name that represent the encapsulated data and behavior for a concept within the plurality of codes. Herein, the term "module name" refers to an identifier for the module. The module name represents a high-level grouping of the extracted plurality of coding components. Herein, the term "file documentation" refers to an explanatory text included at the beginning of a source code file that describes the file's purpose, key functionalities, authorship, or usage details. Notably, the file documentation provides context for the plurality of files that facilitates to understand the file's role in the plurality of codes. Moreover, the code snippets and the generated description of the corresponding code snippets represented by the identified at least one node in the generated knowledge graph. It will be appreciated that the inclusion of diverse node types provides a comprehensive representation of the plurality of coding components in the generated knowledge graph. A technical effect of the aforementioned claim is to enable precise retrieval of code elements and their related plurality of coding components. Additionally, the functional context of code elements, facilitating better decision-making during retrieval or generation.

At step 110, a first index and a second index of the generated knowledge graph is created, based on a complete information and embeddings of the identified at least one node, respectively. Throughout the present disclosure, the term "embeddings" refers to numerical representations of the identified at least one node in a lower-dimensional vector space that captures the semantic meaning, relationships, and context of the identified at least one node. Notably, the embeddings enable efficient similarity comparisons, pattern recognition, and indexing of the generated knowledge graph. It will be appreciated that a machine learning model generates the embeddings by analysing the textual, semantic, or structural features of the identified at least one node. For example, the function name and its description might be converted into a vector that represents its meaning and usage in the plurality of codes. Throughout the present disclosure, the term "complete information" refers to a full set of data and attributes associated with the identified at least one node in the generated knowledge graph. Notably, the complete information may include information about the names (such as function name, class name and the like), code snippets, description of the code snippets, file documentation and the like. The complete information retains the full, unprocessed intact details of the identified at least one node. Throughout the present disclosure, the term "first index" refers to an index of the generated knowledge graph that is created from the complete information of the identified at least one node in the generated knowledge graph. The first index contains a detailed and exhaustive representation of the identified at least one node. It will be appreciated that the first index enables precise, attribute-based retrieval of the plurality of nodes based on exact matches or detailed attributes. Throughout the present disclosure, the term "second index" refers to an index of the generated knowledge graph that is created from the embeddings of the identified at least one node in the generated knowledge graph. The second index of the generated knowledge graph focuses on semantic similarity based on context rather than exact matches. A transformer-based model is used to generate the embeddings and create the second index. Beneficially, the first index and the second index of the generated knowledge graph supports diverse retrieval needs, from exact match queries to semantic similarity searches. The dual-indexing mechanism ensures adaptability and robustness for different user requirements. Moreover, by indexing the generated knowledge graph based on both the complete information and the embeddings, the method creates a hybrid retrieval system that is able to handle the exact and semantic searches simultaneously.

At step 112, a user request is received for generating a code, from a user device. Throughout the present disclosure, the term "user request" refers to a request or search input received from the user. Typically, the user request specifies a requirement for generating a code. Notably, the user query may be in a form of a textual description of a coding task, a natural language query describing the desired behaviour or objective, a prompt specifying technical details such as keywords, algorithms and the like. Throughout the present disclosure, the term "user device" refers to an electronic device that is utilized by the user to submit the user request to generate the code. Typically, the user device may include smartphone, tablet, laptop, and the like. Moreover, the user request provides the starting point for the method to understand what the user needs in terms of code functionality. Furthermore, the user request accommodates diverse users ranging from the developers with specific technical requests to non-technical users providing general-purpose descriptions. The user request can be received through various channels such as web platforms, APIs, IDE plugins, or command-line interfaces. After receiving the user request, the method parses the user request to extract entities, keywords, context, and intent from the generated knowledge graph. It will be appreciated that the user can submit the user request natural language inputs, lowering the barrier for non-technical users. By processing user-specific queries, the method generates contextually relevant code rather than generic solutions.

At step 114, the first index and the second index of the generated knowledge graph is searched, based on at least one entity extracted from the user query and embeddings of the user query, respectively, for identifying a predefined number of nodes in the knowledge graph having a highest similarity score. Throughout the present disclosure, the term "entity" refers to a specific element, keyword or a concept identified from the user request that represents meaningful and actionable information. Typically, the at least one entity may include code components, programming terms, contextual descriptions, semantic embeddings and the like. The at least one entity is extracted from the user request using a large language model (LLM). Moreover, the predefined graph knowledge ontology and the user query is passed to the LLM with a prompt to extract the at least one entity. The at least one entity extracted from the user request guide the search through the first index of the generated knowledge graph. The extraction of the at least one entity from the user query ensures precise alignment between the user's intent and the components stored in the first index of the knowledge graph.

In an implementation, the at least one entity extracted from the user query is at least one of: a class name, a function name. Herein, the term "function name" refers to an identifier assigned to a specific block of code (function) that performs a defined task. Notably, the function name serves as a label for invoking the functionality encapsulated in the function mentioned in the user query. The class name is an identifier assigned to a class in object-oriented programming. Moreover, the method extracts the at least one entity from the user's query that match at least one of the function name, the class name in the knowledge graph. The at least one entity is used to search the first index and the second index for the relevant nodes in the knowledge graph. It will be appreciated that the at least one entity extracted from the user query can be a file, a method, a module and the like. The file refers to a physical or virtual file in a codebase that contains relevant programming constructs. For instance, the file may serve as entry points or storage for specific code components. The method refers to a specific, named block of the code within the class of the module that performs a particular task. The method represents executable logic tied to a specific class or object, serving as an actionable component in the generated knowledge graph. The module refers to an independent entity in the codebase that can be queried or identified in the generated knowledge graph. It allows for the modularization of functionality in programming. A technical of extracting the at least one of: a class name, a function name is to directly map the user query to specific nodes in the knowledge graph and minimize the irrelevant results. Additionally, by narrowing the search scope to specific function or class names, the method reduces computational overhead.

In an implementation, the at least one entity is extracted from the user query using the LLM. Herein, the term "large language model (LLM)" refers to a type of artificial intelligence (AI) model that is designed to understand and generate human-like text based on given vast amounts of training prompts or queries. Typically, the Large Language Model (LLM) is based on deep learning architectures such as transformers. Notably, the LLM is trained on diverse text data to understand linguistic patterns, context and meaning, and can generate responses to natural language user queries, carry out conversations, translate text, summarize information, and the like. The LLM analyses the user query to identify at least one entity like "bubble sort" (function name) and "sorting module" (module name) by performing a full text search in the first index. The analyses process involves tokenizing the user query, identifying named entities, and understanding the context in which terms are used. A technical effect of using the LLM is to provide a deeper understanding of the user's intent, capturing at least one entity that might not be explicitly stated but are implied by the context.

Throughout the present disclosure, the phrase "embeddings of the user query" refers to vector representations of the user query in multi-dimensional numerical space, where the semantic meaning of the user query is encoded. The embeddings of the user query capture the contextual and semantic relationships in the user query, enables the method to perform a similarity-based search that goes beyond simple keyword matching. The language model processed the user query to generate the embeddings. The embeddings of the user query are compared with the embeddings of the identified at least one node in the second index of the generated knowledge graph. Throughout the present disclosure, the term "similarity score" refers to a numerical measure that quantifies the degree of similarity between two embeddings or between the at least one entity from the user query and the identified at least one node in the generated knowledge graph. The similarity score facilitates to identify the most relevant nodes in the generated knowledge graph that align with the user's intent, as derived from the user query. Moreover, the similarity score is determined using methods like cosine similarity, dot product, or Euclidean distance.

The term, "predefined number of nodes" refers to a fixed or adjustable number of nodes that the method aims to identify as most relevant beads on their similarity score. The predefined number of nodes with the highest similarity score within the knowledge graph are identified as most relevant to the user query. The similarity score provides a ranking mechanism to prioritize the most relevant roles in the first index and the second index and ensure efficient and accurate retrieval by filtering out less relevant roles. It will be appreciated that if the user query is incomplete or ambiguous, the method can leverage the at least one entity extracted from the user query and embeddings of the user query to guide search and code retrieval process effectively. A technical effect of establishing the predefined number of nodes, the method effectively manages computational resources while maintaining high accuracy in identifying relevant coding components.

In an implementation, the embeddings of the user query are generated using an encoder model. Herein, the term "encoder model" refers to a machine learning model, often based on neural networks, that is designed to convert the user query into a compact, numerical representation called an embedding. Typically, the encoder model may include transformer-based model, recurrent neural networks, convolutional neural networks and the like. Moreover, the encoder model processes the user query (which may be in natural language or another structured form) and transforms it into the embeddings or vector representation to capture the intent and context of the user query beyond simple keyword matching. The embeddings are used to match the query with relevant nodes in the second index of the knowledge graph. A technical effect of using the encoder model to generate the embeddings of the user query is that the use of embeddings enables rapid similarity computation using metrics like cosine similarity or dot products, even in large datasets.

At step 116, the identified predefined number of nodes are retrieved from the knowledge graph. The predefined number of nodes, identified in the knowledge graph based on the highest similarity score, are retrieved. The identified predefined number of nodes represent the plurality of coding components relevant to the user query. For example, if the user query involves searching for a sorting algorithm, then the predefined number of nodes associated with various sorting methods (e.g., quick sort, bubble sort) are retrieved. It will be appreciated that retrieving of the most similar predefined number of nodes allows the method to focus on plurality of coding components that are directly relevant to the user query. Moreover, by limiting the retrieval the identified predefined number of nodes, the method optimizes computational resources and avoids unnecessary processing of unrelated data. Optionally, the predefined number of retrieved nodes may be called as initial set of retrieved nodes.

At step 118, neighbouring nodes of the retrieved predefined number of nodes is retrieved, from the knowledge graph, for a predefined number of iterations. Throughout the present disclosure, the term "neighbouring nodes" refers to nodes in the knowledge graph that are directly related to the retrieved predefined number of nodes. Notably, the neighbouring nodes may be connected through relationships or shared references, such as imports, function calls, dependencies, or hierarchical structures within the plurality of codes. Moreover, the retrieved neighbouring nodes represent entities that are adjacent or closely associated with the retrieved predefined nodes in the knowledge graph. Throughout the present disclosure, the phrase "predefined number of iterations" refers to a predefined number of times that the process of retrieving the neighbouring nodes is repeated. The method iterates a specific number of times to traverse the knowledge graph further and discover additional related nodes, ultimately expanding the set of relevant coding components. It will be appreciated that the predefined number of iterations is up to n iterations, preferably 2 iterations. For example, if 2 iterations are set as the predefined number of iterations, the method will retrieve neighbouring nodes of the initial set of nodes, then retrieve the neighbouring nodes of those newly retrieved nodes. Beneficially, by retrieving the neighbouring nodes, the method can uncover important links between different parts of the plurality of codes, leading to a more accurate and contextually informed code generation.

At step 120, a subgraph of the retrieved neighbouring nodes and relationships between the retrieved neighbouring nodes is generated. Throughout the present disclosure, the term "subgraph" refers to a subset of the larger knowledge graph that represents the retrieved neighbouring nodes and relationships between the retrieved neighbouring nodes. The edges of the subgraph represent the relationships between the retrieved neighbouring nodes. The subgraph is generated by mapping the retrieved neighbouring nodes and relationships between the retrieved neighbouring nodes into a smaller and focus portion of the knowledge graph. Notably, the subgraph allows the method to concentrate on a specific, relevant portion of the code repository rather than working with the entire knowledge graph. Moreover, by focusing on the retrieved neighbouring nodes and relationships between the retrieved neighbouring nodes the subgraph helps to generate more contextually appropriate code for the user query. It will be appreciated that the subgraph simplifies the problem by limiting the number of nodes and edges that need to be processed, which makes the method more efficient.

At step 122, the generated subgraph is filtered, based on rankings of similarity of the retrieved neighbouring nodes with the user query, using a cross-encoder re-ranker, wherein a given retrieved neighbouring node from amongst the retrieved neighbouring nodes having a rank lower than a threshold value is discarded from the generated subgraph. Throughout the present disclosure, the term "filtering" refers to a process of removing or excluding the retrieved neighbouring nodes from the generated subgraph based on the rankings of the similarity of the retrieved neighbouring nodes to the user query. Notably, the filtering works by evaluating the retrieved neighbouring nodes in the subgraph according to their relevance or similarity to the user query. Throughout the present disclosure, the term "cross-encoder re-ranker" refers to a specialized model within natural language processing (NLP) that compares pairs of text inputs (in this case, the user query and the retrieved neighbouring nodes in the subgraph) to determine their similarity or relevance. Notably, by encoding both the user query and the retrieved neighbouring nodes in the subgraph, the cross-encoder re-ranker assigns a ranking based on similarity score to each retrieved neighbouring node that indicates how well each retrieved neighbouring node matches the query's embedding or informational needs. Furthermore, the cross-encoder re-ranker functions by performing a deeper, more accurate relevance check, as it considers both pieces of text together, rather than encoding them separately. Throughout the present disclosure, the term "rank" refers to the position of the given retrieved neighbouring node based on the assessed similarity between the user query and the given retrieved neighbouring node from amongst the retrieved neighbouring nodes by the cross-encoder re-ranker.

Throughout the present disclosure, the term "given retrieved neighbouring node" refers to a retrieved neighbouring node that is being evaluated for the filtering process. Throughout the present disclosure, the term "threshold value" refers to a predetermined specific criterion or a value that is set by the user to guide the filtering process. Notably, the cross-encoder re-ranker evaluates each retrieved neighbouring node based on the threshold value of the similarity score. The given retrieved neighbouring node with a similarity score higher than the threshold value are kept and the retrieved neighbouring nodes with the similarity score lower than the threshold value are discarded. The filtering process ensures that only the most relevant retrieved neighbouring nodes remain in the subgraph, refining the context before passing the retrieved neighbouring nodes to the next stage. It will be appreciated that irrelevant or noisy retrieved neighbouring nodes that might confuse the code generation process are discarded, ensuring that the generated subgraph remains focused and aligned with the user query.

At step 124, code snippets of the retrieved neighbouring nodes in the filtered subgraph is retrieved, from the generated knowledge graph. The specific code snippets, associated with the retrieved neighbouring nodes in the filtered subgraph, is retrieved. By retrieving the code snippets associated with the retrieved neighbouring nodes in the filtered subgraph, the method ensures that it is pulling in relevant, context-aware examples of code that can help to generate the desired code. Moreover, the purpose is to extract the code snippets that best match the requirements of the user's query. Furthermore, the filtered subgraph consists of the retrieved neighbouring nodes that represent key components of the plurality of codes, such as functions, methods, or classes, that are highly relevant to the user's request. Each of the retrieved neighbouring node is connected to the code snippets in the generated knowledge graph. The method performs a retrieval process to extract the code snippets for the functions and the classes from the generate knowledge graph. This could involve querying the filtered subgraph for the code snippets associated with the retrieved neighbouring nodes that are present in the filtered subgraph. It will be appreciated that the method retrieves only those code snippets that are contextually relevant to the user query.

At step 126, a contextualized subgraph is generated, based on the retrieved code snippets of the retrieved neighbouring nodes, relationships between the retrieved code snippets of the retrieved neighbouring nodes, and a context of the code to be generated. Throughout the present disclosure, the term "context" refers to a specific information or parameters that define the environment, requirements or constraints in which the code to be generated will operate. Notably, the context may include the purpose, desired functionality, structure, dependencies and the like domain-specific detail that are relevant for generating the code that is aligned with the user query. Throughout the present disclosure, the term "contextualized subgraph" refers to a specialized subset of the knowledge graph that is refined to incorporate the retrieved code snippets of the retrieved neighbouring nodes and relationship therebetween and also the context of the code to be generated. Moreover, the relationships between the retrieved code snippets represents how the retrieved code snippets interact, depend on each other or are structured. It will be appreciated that the contextualized subgraph serve as a focused and enriched representation of the knowledge graph that directly corresponds to the user's intent. Beneficially, by incorporating the context of the code to be generated, the contextualized subgraph becomes tailored to the specific needs of the user query, ensuring that irrelevant or unrelated code snippets of the neighbouring nodes are excluded. It will also be appreciated that the inclusion of the relationships between the retrieved code snippets ensures that the generated code respects dependencies, hierarchy, and structural integrity.

At step 128, a Large Language Model (LLM) is prompted with the generated contextualized subgraph, the predefined knowledge graph ontology, and at least one area of interest, for generating the code. Throughout the present disclosure, the term "prompting" refers to a process of providing input to the large language model (LLM) to generate accurate and contextually relevant code. Throughout the present disclosure, the term "area of interest" refers to a specific domain, topic, or functional requirement relevant to the user's query or the intended purpose of the generated code. For example, the at least one area of interest may include functional area such as data processing, web development or machine learning. It will be appreciated that the at least one area of interest helps the LLM to focus on generating the code that aligns not only with the structure of the contextualized subgraph but also with the specific application or domain requirements defined by the user or the method. Moreover, during the prompting, the LLM is presented with the contextualized subgraph, the predefined knowledge graph ontology and the at least one area of interest for generating the code. The prompting serves as the mechanism through which the method communicates instructions and relevant data to the LLM to generate accurate code. It will be appreciated that the LLM enables the automation of code generation, reducing the time and effort required to write the code manually. Furthermore, the knowledge graph ontology helps the LLM to interpret and maintain the semantic structure. The LLM processes the input and produces code that reflects the relationships, semantics, and contextual information encoded in the retrieved contextualized subgraph and the predefined knowledge graph ontology.

Figure 2:
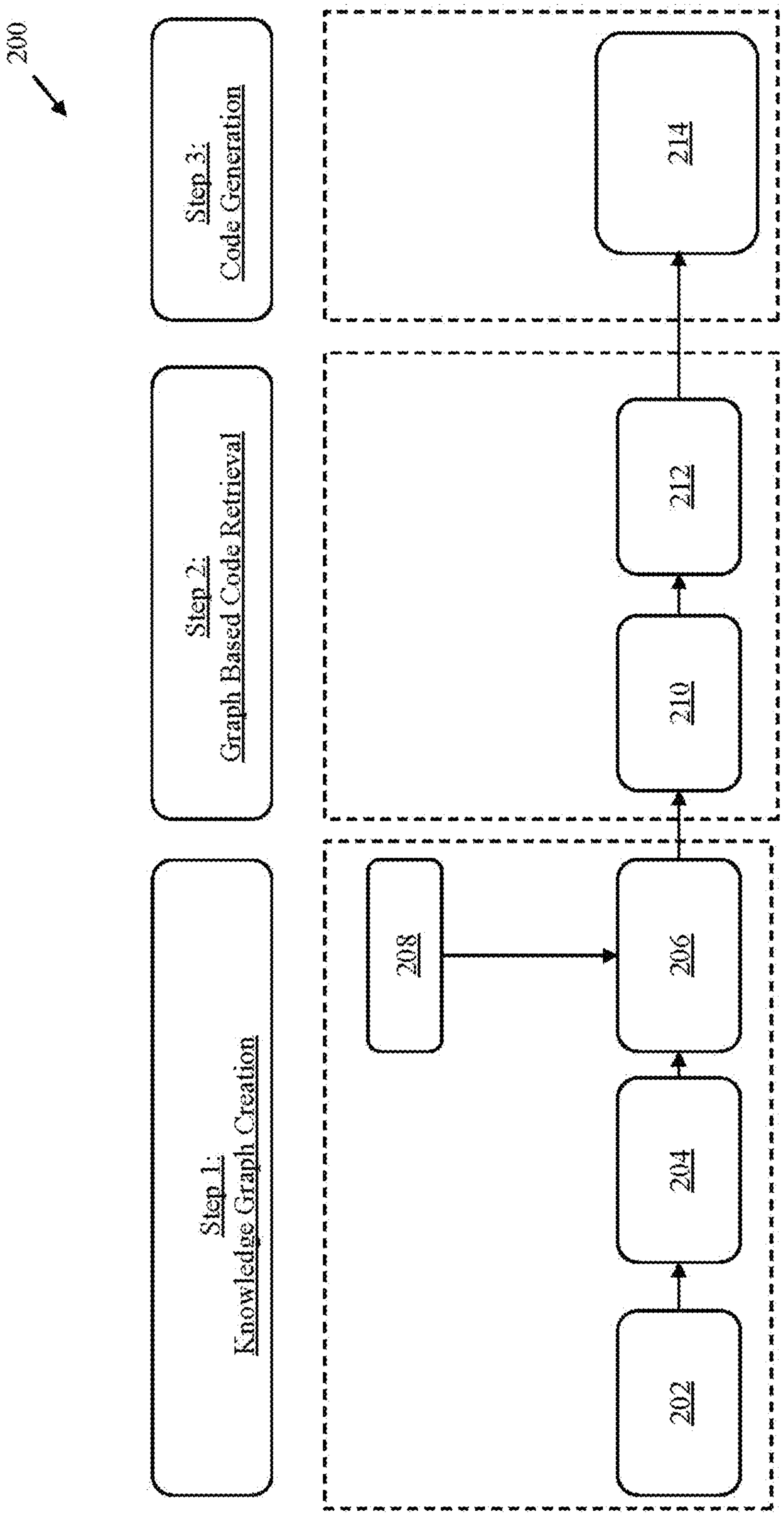
FIG. 2 is a flow chart depicting of an exemplary scenario of a code retrieval and code generation, in accordance with an embodiment of the present disclosure.

FIG. 2 is a flow chart depicting an exemplary scenario of a code retrieval and code generation 200, in accordance with an embodiment of the present disclosure. At step 202, a code repository comprising a plurality of codes stored in a plurality of files is received. At step 204, one or more parsable files is identified from amongst the plurality of files, based on a coding language of the plurality of codes and the identified one or more parsable files are parsed for extracting the plurality of coding components. At step 206, a knowledge graph comprising a plurality of nodes representing the extracted plurality of coding components, and a plurality of edges representing relationships between the extracted plurality of coding components is created, wherein the knowledge graph is generated based on a predefined knowledge graph ontology 208. At step 210, a first index and a second index of the generated knowledge graph is created, based on a complete information and embeddings of the identified at least one node, respectively. At step 212, code snippets of the retrieved neighbouring nodes in the filtered subgraph are retrieved, from the generated knowledge graph. At step 214, a Large Language Model (LLM) is prompted with the generated contextualized subgraph, the predefined knowledge graph ontology, and at least one area of interest, for generating the code.

Figure 3:
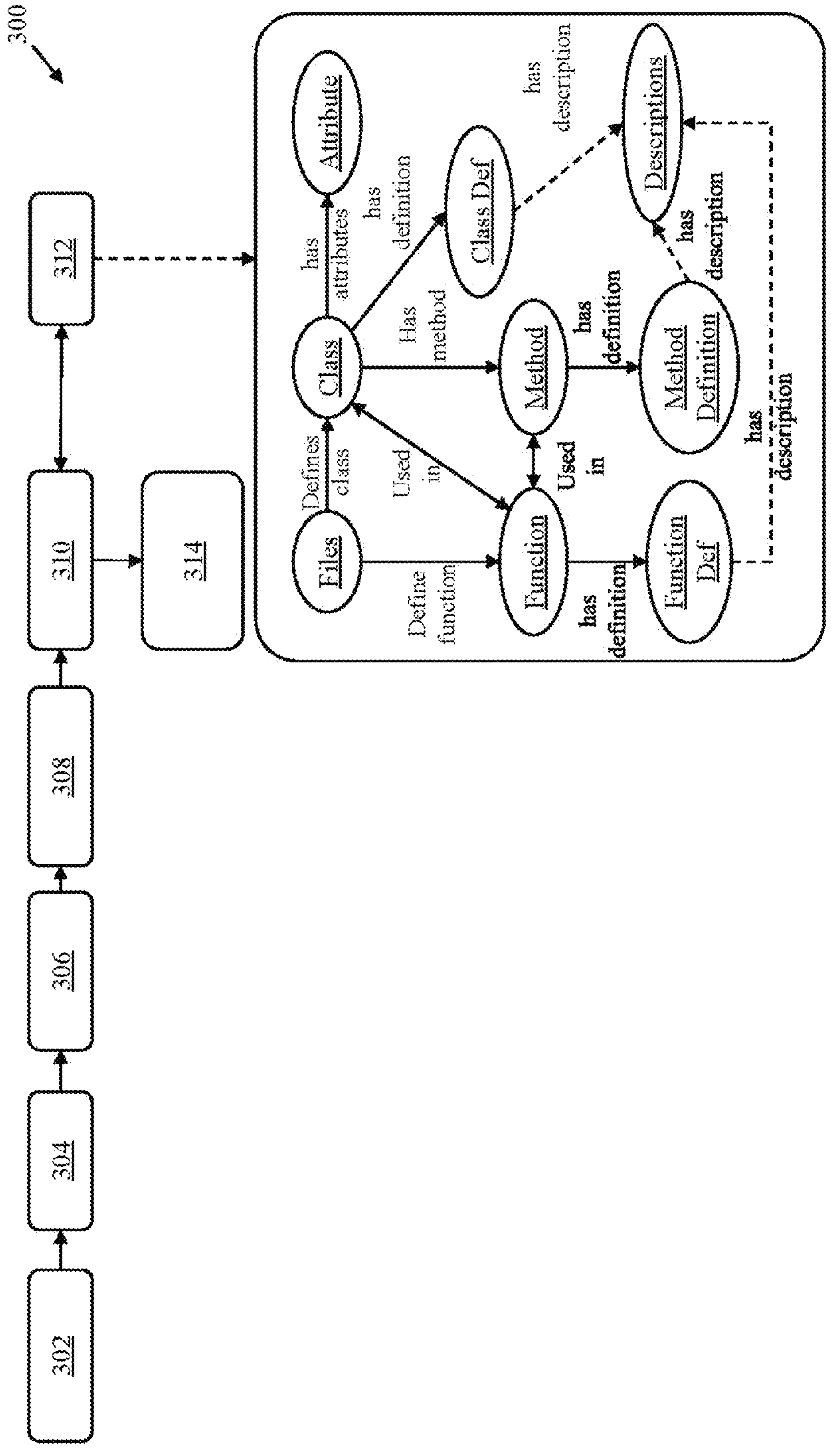
FIG. 3 is a flow chart depicting of an exemplary scenario of a knowledge graph construction, in accordance with an embodiment of the present disclosure.

FIG. 3 is a flow chart depicting of an exemplary scenario of a knowledge graph construction 300, in accordance with an embodiment of the present disclosure. As shown, a code repository 302 comprising a plurality of codes stored in a plurality of files is received. At step 304, one or more parsable files from amongst the plurality of files is identified, based on a coding language of the plurality of codes. At step 306, the identified one or more parsable files is parsed for extracting the plurality of coding components. At step 308, a plurality of coding components is identified and extracted from the plurality of codes. At step 310, aligned the parsed plurality of coding components with a predefined knowledge graph ontology 312. At step 314, a knowledge graph comprising a plurality of nodes representing the extracted plurality of coding components, and a plurality of edges representing relationships between the extracted plurality of coding components is generated. The predefined knowledge graph ontology 312 comprises plurality of nodes (such as a function name, a class name, a module name, a file documentation, descriptions of code snippets, method definition, class definition and the like) representing the plurality of coding components. Moreover, the edges of the predefined knowledge graph ontology 312 represents relationship between the plurality of coding components (such as imports, usage). Furthermore, each file of predefined knowledge graph ontology 312 in the code repository defines one or more classes or functions represented by edges labeled "Defines class" and "Defines function". The classes contain attributes representing their properties and the edge "Has attribute" connects classes to their attributes. Each class can have multiple methods associated with it and the edge "Has method" links a class to its corresponding methods. The methods and functions can refer or utilize one another and the edge "Used in" represents this interaction. Moreover, the classes, methods, and functions are linked to their detailed implementations via edges labelled "Has definition". Furthermore, the generated descriptions provide human-readable summaries for functions, classes, and methods. The edge "Has description" connects these components to their respective descriptions.

Figure 4:
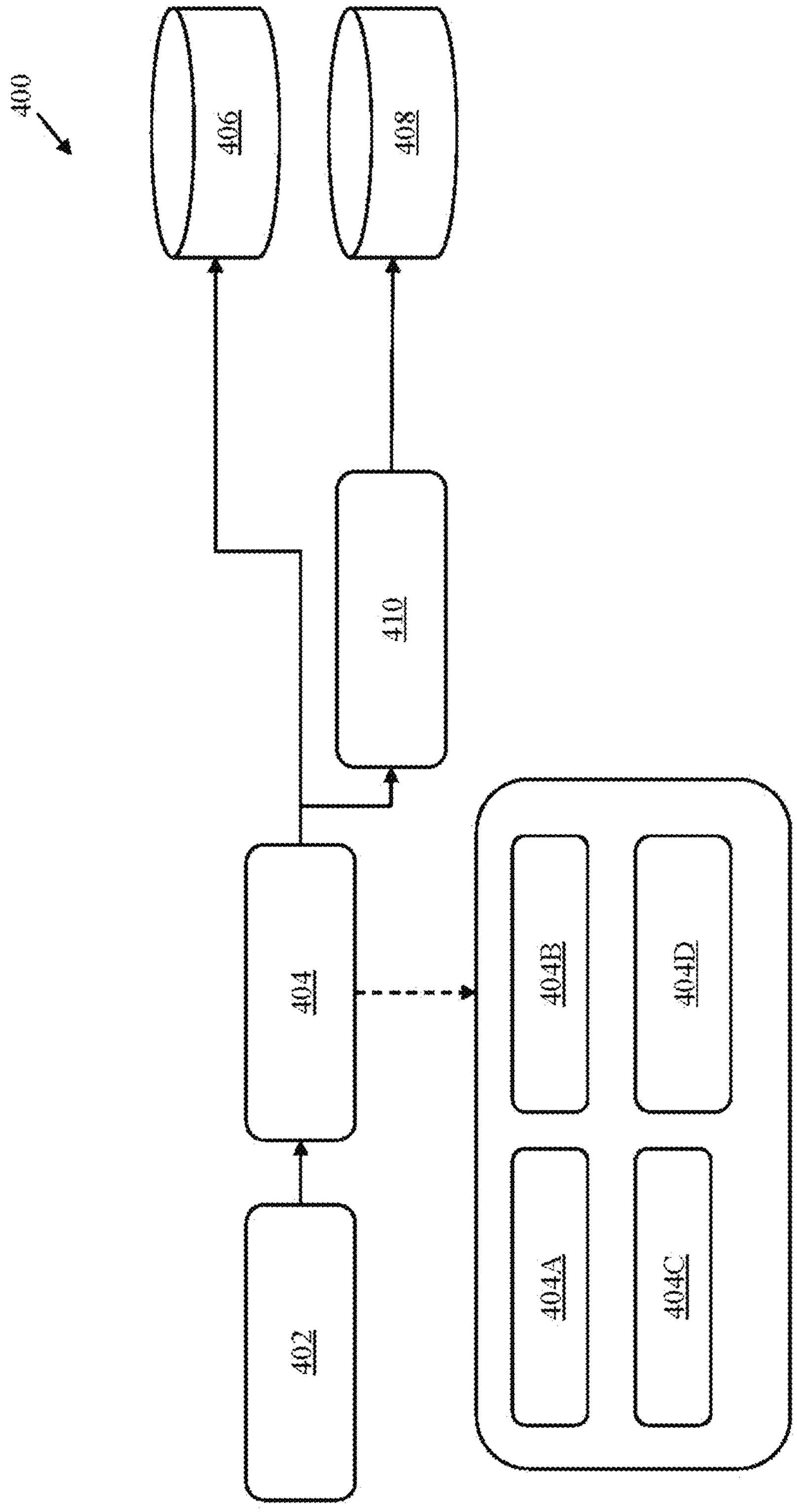
FIG. 4 is a flow chart depicting of an exemplary scenario of an index creation, in accordance with an embodiment of the present disclosure.

FIG. 4 is a flow chart depicting of an exemplary scenario of an index creation 400, in accordance with an embodiment of the present disclosure. At step 402, a knowledge graph comprising a plurality of nodes representing the extracted plurality of coding components, and a plurality of edges representing relationships between the extracted plurality of coding components is created, wherein the knowledge graph is generated based on a predefined knowledge graph ontology. At step 404, at least one node in the generated knowledge graph is identified, for indexing the generated knowledge graph. Optionally, the at least one node identified in the generated knowledge graph comprises at least one of: a class name 404A, a file documentation 404B, the code snippets 404C and the generated description 404D of the corresponding code snippets. As shown, a first index 406 and a second index 408 of the generated knowledge graph is created, based on a complete information and embeddings of the identified at least one node, respectively. The second index 408 is created on top of data such as documentation and descriptions generated by the LLM to retrieve logically similar code pieces from the knowledge graph based on the requirements of the user. Moreover, an encoder 410 is used to get the embeddings to create the second index 408.

Figure 5A:
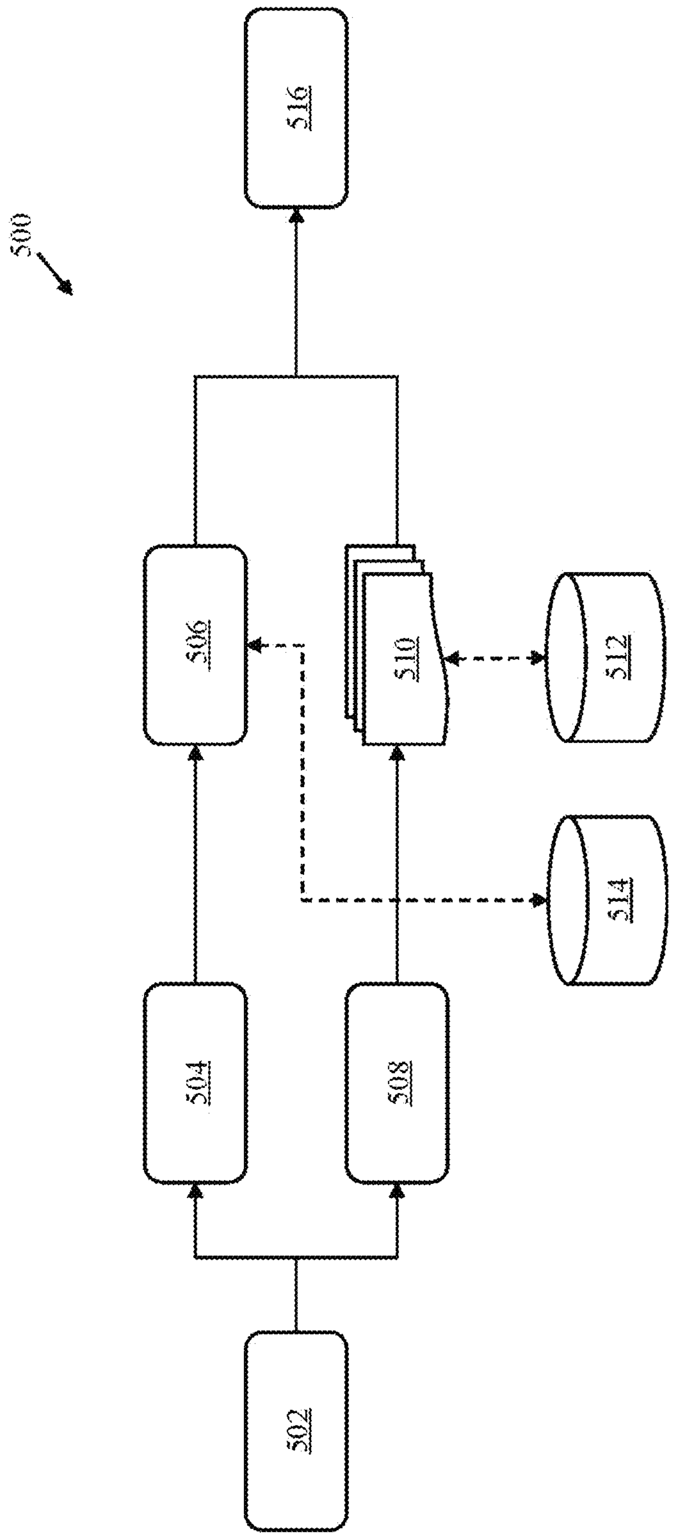
FIGS. 5A and 5B are flow charts depicting of an exemplary scenario of code retrieval, in accordance with an embodiment of the present disclosure.
Figure 5B:
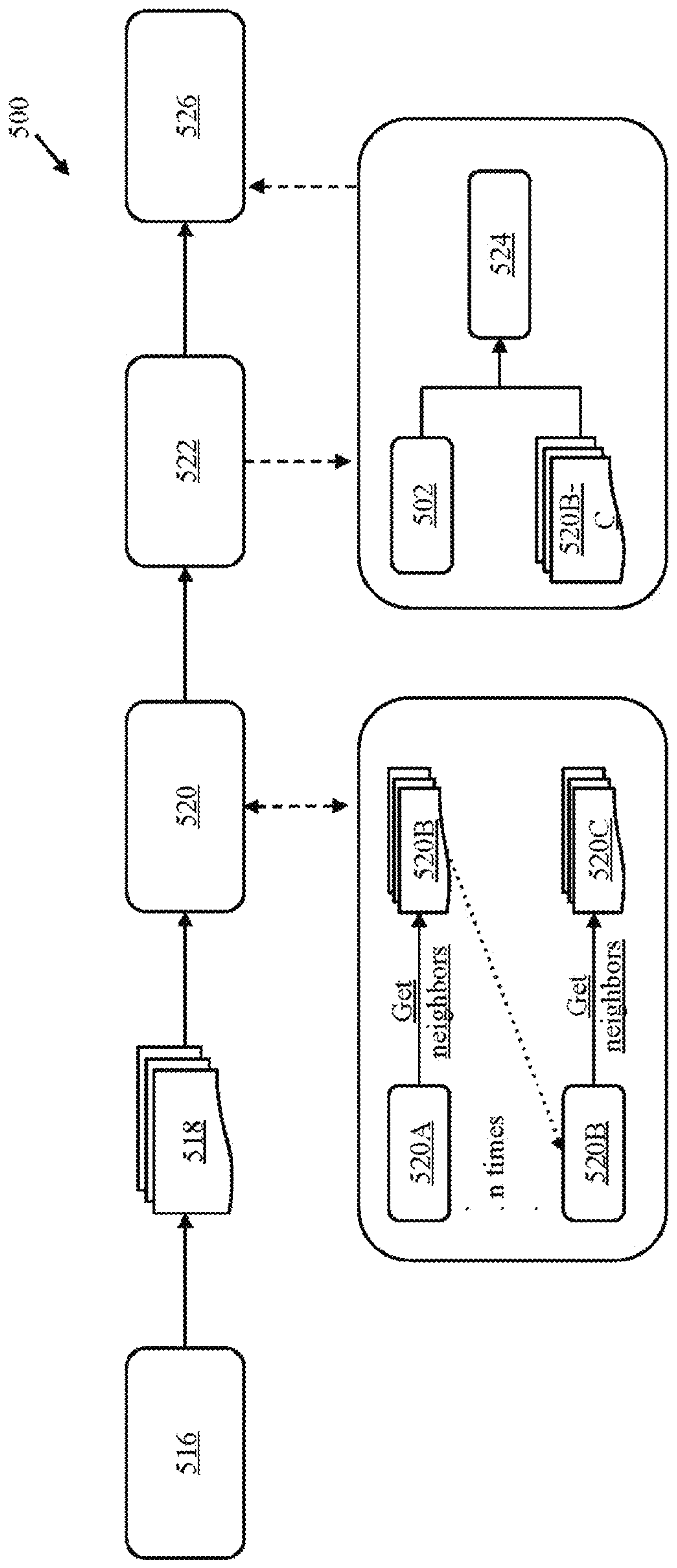

FIGS. 5A and 5B are flow charts depicting exemplary scenarios of code retrieval 500, in accordance with an embodiment of the present disclosure.

With reference to FIG. 5A, a user request 502 to generate a code is received, from a user device. An encoder model 504 is used to generate embeddings or vector representation 506 of the user query. The user query is also passed through a large language model (LLM) 508 to extract the at least one entity 510 mentioned by the user in the user query. The first index 512 and the second index 514 of the generated knowledge graph is searched, based on at least one entity 510 extracted from the user query and embeddings 506 of the user query, respectively, for identifying a predefined number of nodes 516 in the knowledge graph having a highest similarity score.

With reference to FIG. 5B, a predefined number of nodes 516 is identified in the knowledge graph having a highest similarity score. At step 518, the identified predefined number of nodes from the knowledge graph is retrieved. At step 520, neighbouring nodes of the retrieved predefined number of nodes are retrieved, from the knowledge graph, for a predefined number of iterations. For example, if 2 iterations are set as the predefined number of iterations, the method will retrieve neighbouring nodes 520B of the initial set of nodes 520A, then retrieve the neighbouring nodes 520C of those newly retrieved nodes 520B. At step 522, a subgraph of the retrieved neighbouring nodes and relationships between the retrieved neighbouring nodes is generated. The generated subgraph is filtered, based on ranking of similarity of the retrieved neighbouring nodes 520B-C with the user query 502, using a cross-encoder re-ranker 524, wherein a given retrieved neighbouring node from amongst the retrieved neighbouring nodes 520B-C having a rank lower than a threshold value is discarded from the generated subgraph. At step 526, the filtered subgraph is received.

Figure 6:
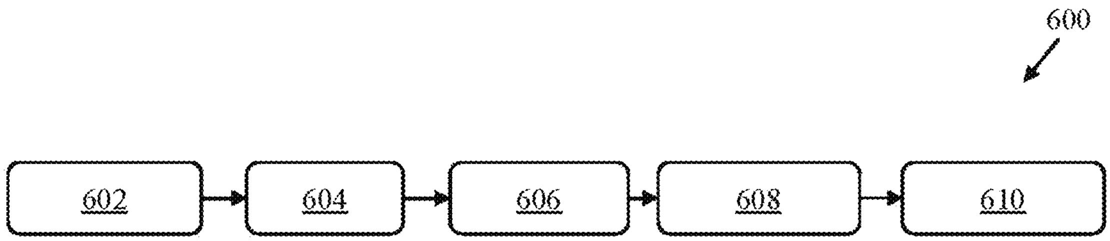
FIG. 6 is a flow chart depicting of an exemplary scenario of code generation, in accordance with an embodiment of the present disclosure.

FIG. 6 is a flow chart depicting of an exemplary scenario of code generation 600, in accordance with an embodiment of the present disclosure. At step 602, the filtered subgraph is received. At step 604, code snippets of the retrieved neighbouring nodes in the filtered subgraph is received, from the generated knowledge graph. At step 606, the contextualized subgraph, the predefined knowledge graph ontology, and at least one area of interest is fed to custom prompt that instructs a large language model (LLM) 608 to generate the code 610.

Figure 7:
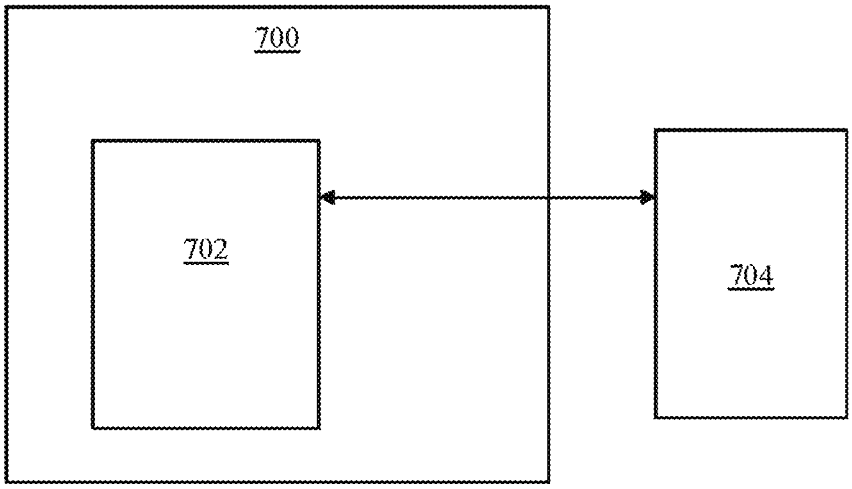
FIG. 7 is a schematic illustration of a system for automated code retrieval and code generation, in accordance with an embodiment of the present disclosure.

FIG. 7 is a schematic illustration of a system for automated code retrieval and code generation, in accordance with an embodiment of the present disclosure. As shown in FIG. 7, the system 700 comprises a processing unit 702. The processing unit 702 is configured to receive a code repository comprising a plurality of codes stored in a plurality of files. Moreover, the processing unit 702 is configured to extract a plurality of coding components from the plurality of codes. Optionally the processing unit 702 is further configured to: identify one or more parsable files from amongst the plurality of files, based on a coding language of the plurality of codes; and parse the identified one or more parsable files for extracting the plurality of coding components. Furthermore, the processing unit 702 is configured to generate a knowledge graph comprising a plurality of nodes representing the extracted plurality of coding components, and a plurality of edges representing relationships between the extracted plurality of coding components, wherein the knowledge graph is generated based on a predefined knowledge graph ontology. Furthermore, the processing unit 702 is configured to identify at least one node in the generated knowledge graph, to index the generated knowledge graph. Furthermore, the processing unit 702 is configured to create a first index and a second index of the generated knowledge graph, based on a complete information and embeddings of the identified at least one node, respectively. Furthermore, the processing unit 702 is configured to receive a user request to generate a code, from a user device 704. Furthermore, the processing unit 702 is configured to search the first index and the second index of the generated knowledge graph, based on at least one entity extracted from the user query and embeddings of the user query, respectively, to identify a predefined number of nodes in the knowledge graph having a highest similarity score. Furthermore, the processing unit 702 is configured to retrieve the identified predefined number of nodes from the knowledge graph. Furthermore, the processing unit 702 is configured to retrieve neighbouring nodes of the retrieved predefined number of nodes, from the knowledge graph, for a predefined number of iterations. Furthermore, the processing unit 702 is configured to generate a subgraph of the retrieved neighbouring nodes and relationships between the retrieved neighbouring nodes. Furthermore, the processing unit 702 is configured to filter the generated subgraph, based on rankings of similarity of the retrieved neighbouring nodes with the user query, using a cross-encoder re-ranker, wherein a given retrieved neighbouring node from amongst the retrieved neighbouring nodes having a rank greater than a threshold value is discarded from the generated subgraph. Furthermore, the processing unit 702 is configured to retrieve code snippets of the retrieved neighbouring nodes in the filtered subgraph, from the generated knowledge graph. Furthermore, the processing unit 702 is configured to generate a contextualized subgraph, based on the retrieved code snippets of the retrieved neighbouring nodes, relationships between the of the retrieved neighbouring nodes, and a context of the code to be generated. Furthermore, the processing unit 702 is configured to prompt a Large Language Model (LLM) with the generated contextualized subgraph, the predefined knowledge graph ontology, and at least one area of interest, to generate the code.

Herein, the term processing unit 702 refers to a computational element that is operable to execute the software framework. Examples of the processing unit 702 include, but are not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the processing unit 702 may refer to one or more individual processors, processing devices and various elements associated with a processing device that may be shared by other processing devices. Additionally, one or more individual processors, processing devices and elements are arranged in various architectures for responding to and processing the instructions that execute the software framework. Optionally, the system 700 further comprises a memory for storing the plurality of coding components represented by the plurality of nodes.

Figure 8:
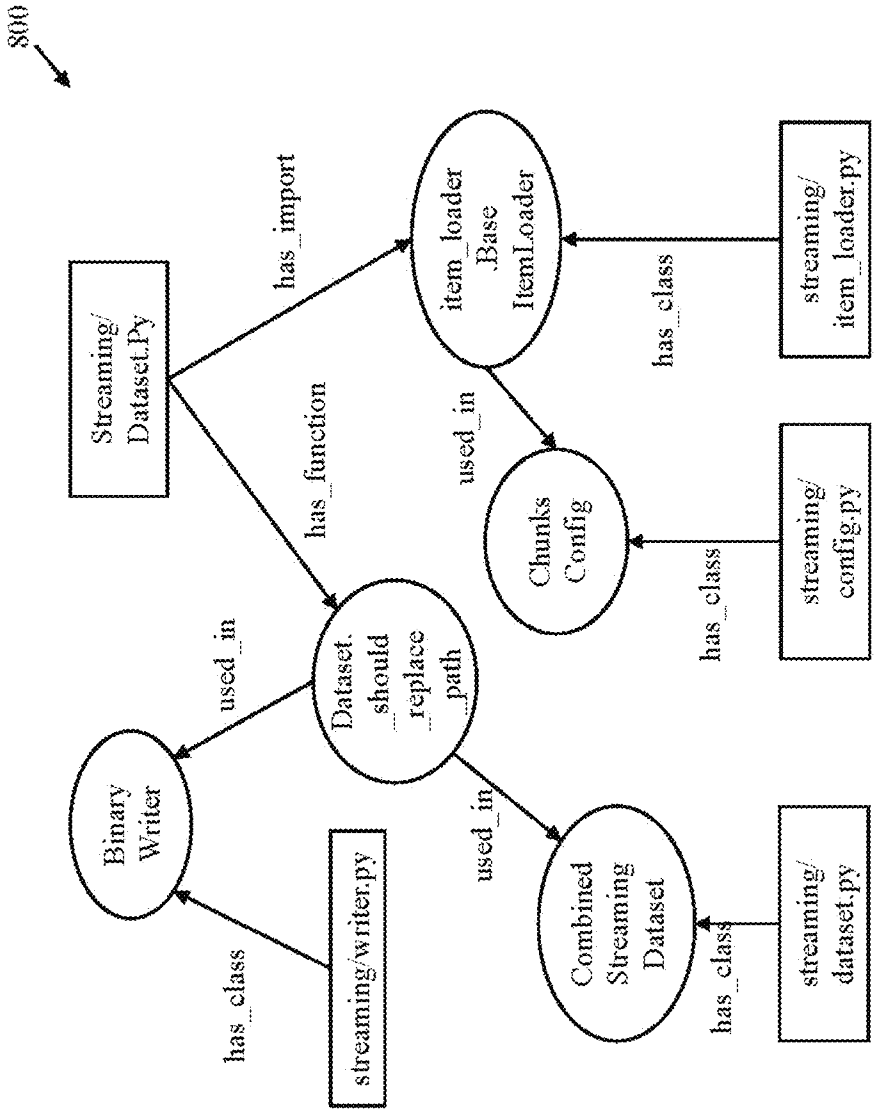
FIG. 8 is an exemplary implementation of a subgraph, in accordance with an embodiment of the present disclosure.

FIG. 8 is an exemplary implementation of a subgraph 800, in accordance with an embodiment of the present disclosure. The generated knowledge graph is expanded by retrieving related classes, functions, and imports, constructing a 2-hop subgraph that includes neighboring elements within the file and across other related files. As shown, a function called "dataset should replace path" is written. The function is present in the dataset of parsed files such as "streaming/dataset.py". The 2-hop neighbouring nodes are determined from the particular node where the function is present. The n-hop is determined to know about the other functions present in the dataset. The relationships between the nodes are labelled to describe their semantic connections such as "has_class" indicates that a file contains the definition of a class. For example, streaming/dataset.py is connected to dataset with the edge has_class. Moreover, the "has_function" indicates that a file or class contains a specific function. For example, streaming/dataset.py has the function dataset._should_replace_path. The "used_in" represents where a specific class, function, or attribute is utilized in the code repository. For example, "dataset._should_replace_path" is used in the "CombinedStreamingDataset" and "ChunksConfig" classes. The "has_import" represents the inclusion of an external class or function via import statements. For example, "item_loader.BaseItemLoader" is imported into "streaming/dataset.py".

Modifications to embodiments of the present disclosure described in the foregoing are possible without departing from the scope of the present disclosure as defined by the accompanying claims. Expressions such as "including", "comprising", "incorporating", "have", "is" used to describe, and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

What is claimed is:

1. A method for automated code retrieval and code generation, the method comprising:
  - receiving a code repository (302) comprising a plurality of codes stored in a plurality of files;
  - extracting a plurality of coding components from the plurality of codes;
  - generating a knowledge graph comprising a plurality of nodes representing the extracted plurality of coding components, and a plurality of edges representing relationships between the extracted plurality of coding components, wherein the knowledge graph is generated based on a predefined knowledge graph ontology (208, 312);
  - identifying at least one node in the generated knowledge graph, for indexing the generated knowledge graph;
  - creating a first index (406, 512) and a second index (408, 514) of the generated knowledge graph, based on a complete information and embeddings of the identified at least one node, respectively;
  - receiving a user request (502) for generating a code (610), from a user device;
  - searching the first index and the second index of the generated knowledge graph, based on at least one entity (510) extracted from the user query and embeddings (506) of the user query, respectively, for identifying a predefined number of nodes (516, 520A) in the knowledge graph having a highest similarity score;
  - retrieving the identified predefined number of nodes from the knowledge graph;
  - retrieving neighbouring nodes (520B, 520C) of the retrieved predefined number of nodes, from the knowledge graph, for a predefined number of iterations;
  - generating a subgraph of the retrieved neighbouring nodes and relationships between the retrieved neighbouring nodes;

filtering the generated subgraph, based on rankings of similarity of the retrieved neighbouring nodes with the user query, using a cross-encoder re-ranker (524), wherein a given retrieved neighbouring node from amongst the retrieved neighbouring nodes having a rank lower than a threshold value is discarded from the generated subgraph;

retrieving code snippets of the retrieved neighbouring nodes in the filtered subgraph, from the generated knowledge graph;

generating a contextualized subgraph, based on the retrieved code snippets of the retrieved neighbouring nodes, relationships between the retrieved code snippets of the retrieved neighbouring nodes, and a context of the code to be generated; and prompting a Large Language Model (LLM) (608) with the generated contextualized subgraph, the predefined knowledge graph ontology, and at least one area of interest, for generating the code (610).

2. The method of claim 1, wherein the step of extracting a plurality of coding components from the plurality of codes further comprises:

identifying one or more parsable files from amongst the plurality of files, based on a coding language of the plurality of codes;

parsing the identified one or more parsable files for extracting the plurality of coding components.

3. The method of claim 1, wherein the extracted plurality of coding components comprises at least one of: modules, classes, methods, code snippets (404C).

4. The method of claim 1, wherein the relationships between the extracted plurality of coding components comprises at least one of: imports, usage.

5. The method of claim 1, further comprising generating a description of each code snippet represented in the generated knowledge graph, using a Small Language Model (SLM).

6. The method of claim 5, wherein the at least one node identified in the generated knowledge graph comprises at least one of: a function name, a class name (404A), a module name, a file documentation (404B), the code snippets (404C), the generated description (404D) of corresponding code snippets.

7. The method of claim 1, wherein the at least one entity (510) extracted from the user query (502) is at least one of: a class name (404A), a function name.

8. The method of claim 1, wherein the embeddings (506) of the user query (502) are generated using an encoder model (410).

9. The method of claim 1, wherein the at least one entity (510) is extracted from the user query (502) using the LLM (508).

10. A system (700) for automated code retrieval and code generation, the system comprising a processing unit (702) configured to:

receive a code repository (302) comprising a plurality of codes stored in a plurality of files;

extract a plurality of coding components from the plurality of codes;

generate a knowledge graph comprising a plurality of nodes representing the extracted plurality of coding components, and a plurality of edges representing relationships between the extracted plurality of coding components, wherein the knowledge graph is generated based on a predefined knowledge graph ontology (208, 312);

identify at least one node in the generated knowledge graph, to index the generated knowledge graph;

create a first index (406, 512) and a second index (408, 514) of the generated knowledge graph, based on a complete information and embeddings of the identified at least one node, respectively;

receive a user request (502) to generate a code, from a user device (704);

search the first index and the second index of the generated knowledge graph, based on at least one entity (510) extracted from the user query and embeddings (506) of the user query, respectively, to identify a predefined number of nodes (516, 520A) in the knowledge graph having a highest similarity score;

retrieve the identified predefined number of nodes from the knowledge graph;

retrieve neighbouring nodes (520B, 520C) of the retrieved predefined number of nodes, from the knowledge graph, for a predefined number of iterations;

generate a subgraph of the retrieved neighbouring nodes and relationships between the retrieved neighbouring nodes;

filter the generated subgraph, based on rankings of similarity of the retrieved neighbouring nodes with the user query, using a cross-encoder re-ranker (524), wherein a given retrieved neighbouring node from amongst the retrieved neighbouring nodes having a rank lower than a threshold value is discarded from the generated subgraph;

retrieve code snippets of the retrieved neighbouring nodes in the filtered subgraph, from the generated knowledge graph;

generate a contextualized subgraph, based on the retrieved code snippets of the retrieved neighbouring nodes, relationships between the retrieved code snippets of the retrieved neighbouring nodes, and a context of the code to be generated; and prompt a Large Language Model (LLM) (608) with the generated contextualized subgraph, the predefined knowledge graph ontology, and at least one area of interest, to generate the code.

11. The system (700) of claim 10, wherein the step of extracting a plurality of coding components from the plurality of codes further comprises:

identifying one or more parsable files from amongst the plurality of files, based on a coding language of the plurality of codes; and parsing the identified one or more parsable files for extracting the plurality of coding components.

12. The system (700) of claim 10, wherein the extracted plurality of coding components comprises at least one of: modules, classes, methods, code snippets (404C).

13. The system (700) of claim 10, wherein the relationships between the extracted plurality of coding components comprises at least one of: imports, usage.

14. The system (700) of claim 10, wherein the processing unit (702) is further configured to generate a description of each code snippet represented in the generated knowledge graph, using a Small Language Model (SLM).

15. The system (700) of claim 14, wherein the at least one node identified in the generated knowledge graph comprises at least one of: a function name, a class name (404A), a module name, a file documentation (404B), the code snippets (404C), the generated description (404D) of corresponding code snippets.

16. The system (700) of claim 10, wherein the at least one entity (510) extracted from the user query (502) is at least one of: a class name (404A), a function name.

17. The system (700) of claim 10, wherein the processing unit (702) is configured to generate the embeddings (506) of the user query (502) using an encoder model (410).

18. The system (700) of claim 10, wherein the processing unit (702) is configured to extract the at least one entity (510) from the user query (502) using the LLM (508).

* * * * *